Dec. 7, 1954 T. CARROLL 2,696,290
VERTICAL ELEVATOR FOR COMBINES
Filed April 22, 1950 4 Sheets-Sheet 1
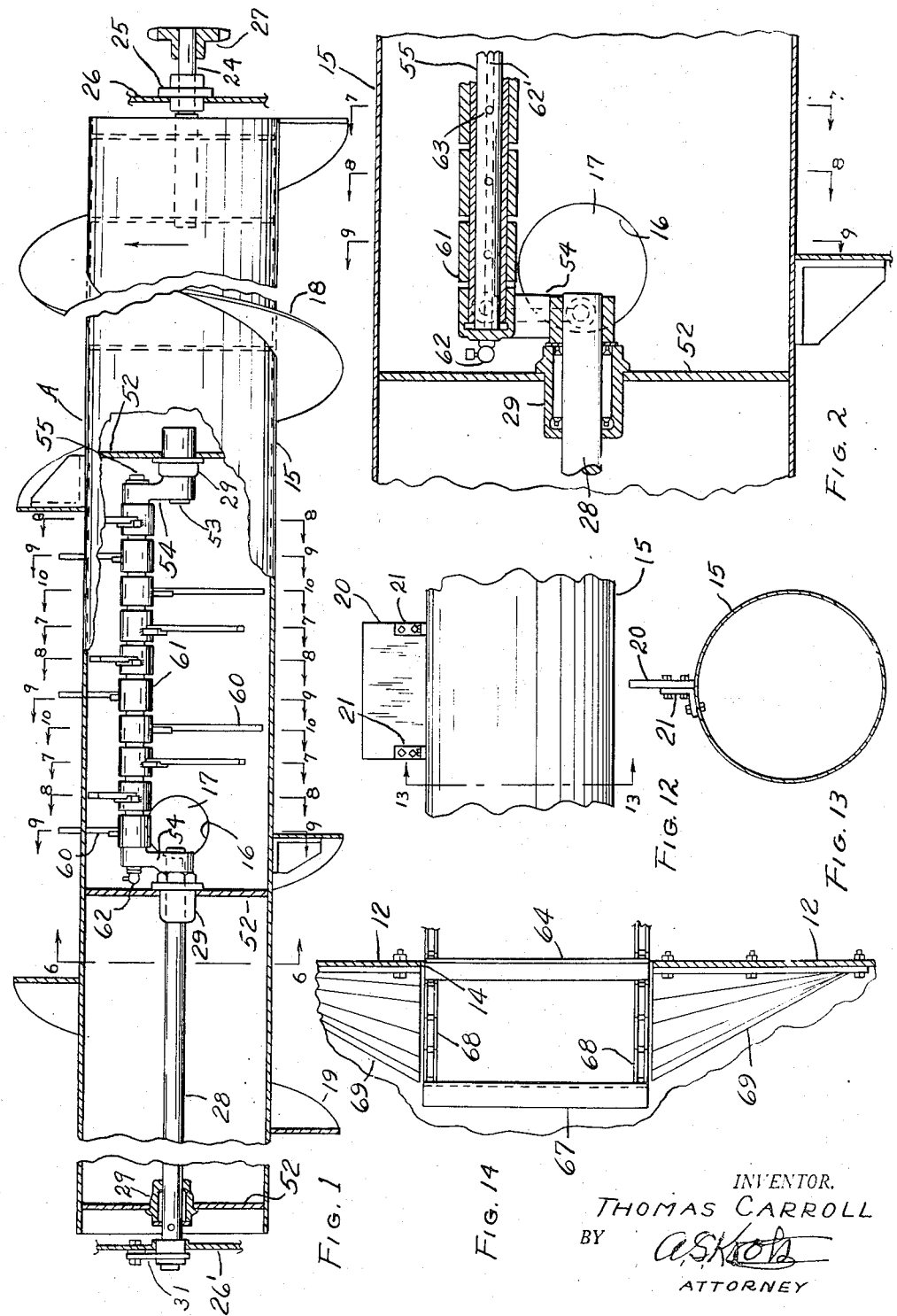

Dec. 7, 1954 T. CARROLL 2,696,290
VERTICAL ELEVATOR FOR COMBINES
Filed April 22, 1950 4 Sheets-Sheet 2
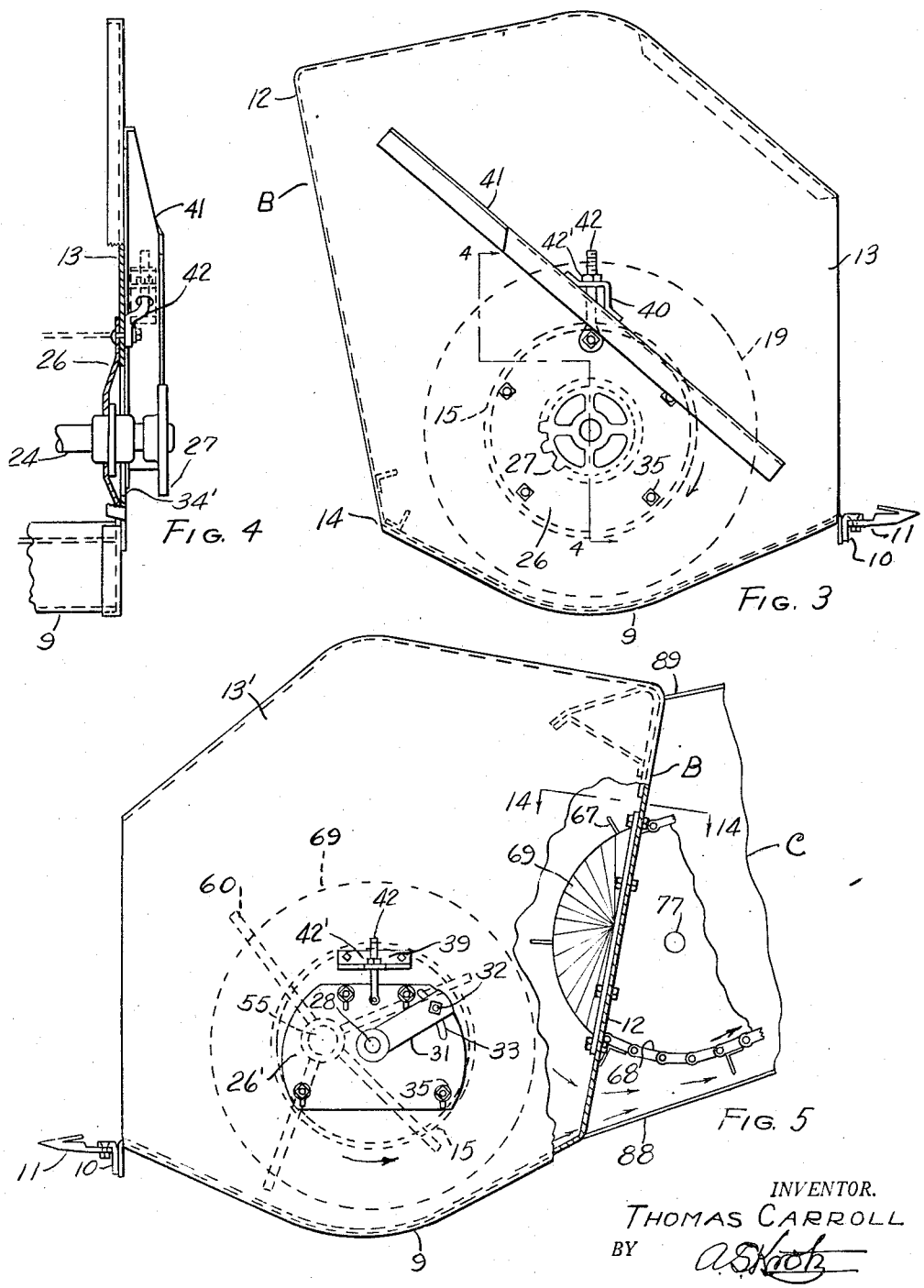
INVENTOR.
THOMAS CARROLL
BY
ATTORNEY Dec. 7, 1954 T. CARROLL 2,696,290
VERTICAL ELEVATOR FOR COMBINES
Filed April 22, 1950 4 Sheets-Sheet 3

INVENTOR.
THOMAS CARROLL
BY
ATTORNEY

Dec. 7, 1954 T. CARROLL 2,696,290
VERTICAL ELEVATOR FOR COMBINES
Filed April 22, 1950 4 Sheets-Sheet 4

INVENTOR.
THOMAS CARROLL
BY
ATTORNEY

United States Patent Office 2,696,290
Patented Dec. 7, 1954

2,696,290

VERTICAL ELEVATOR FOR COMBINES

Thomas Carroll, Toronto, Ontario, Canada, assignor to Massey-Harris Co. Ltd., Toronto, Ontario, Canada, a corporation of Canada Application April 22, 1950, Serial No. 157,546

2 Claims. (Cl. 198—174)

This invention relates to combine harvesters and is more particularly concerned with the elevator or conveyor which conveys the crop material from the harvester portion of the combine to the thresher portion.

An important feature of the present invention is the means provided for moving any grain that may fall under the upper flights of the elevator to the exterior of the elevator at a point where it can join the mass of grain as it passes into the elevator.

It is an object of this invention to provide an undershot elevator which will prevent any crop material carried over in the wrong direction from being wound up in the elevator parts and which will deliver any carried over crop material forwardly and discharge it at such a location so as to be again fed into the proper location in the elevator.

To these and other useful ends, my invention consists of parts, combinations of parts or their equivalents and mode of operation as hereinafter described and claimed and shown in the accompanying drawings in which:

Fig. 1 is a partially sectioned side elevational view of a fraction of my improved auger tube.

Fig. 2 is an enlarged fractional longitudinal sectional view of the device as shown in Figure 1.

Fig. 3 is a right hand elevational end view of my auger table with the tube in its lowest adjusted position as indicated by dotted lines.

Fig. 4 is a longitudinal section through the right hand auger table end closure taken on line 4—4 of Figure 3.

Fig. 5 is a left hand end view of the table partially sectioned, illustrating the auger tube and flights by dotted lines and showing the lever used for adjusting the finger crank shaft, the end member being cut away so as to illustrate the position of the guiding cone.

Fig. 12 illustrates a fraction of the auger tube showing a sweeper blade in position and Fig. 13 illustrates a section taken on line 13—13 of Figure 12, illustrating a sweeper blade attached to the tube.

Fig. 14 is a top sectional view of the vertically extending portion of the trough taken on lines 14—14 of Figure 5, illustrating the protruding end of the elevator and the cone shaped guide members.

Figure 6:
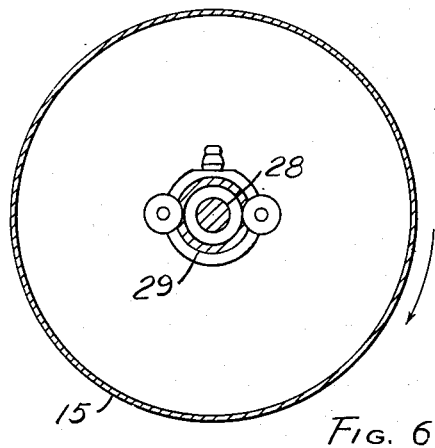
Fig. 6 is an end view of the auger tube taken on line 6—6 of Figure 1.

The present invention comprises a trough 9 having secured to its front edge for the length of the trough, an angle bar 10 having secured thereto spaced guards 11 forming a cutter bar adapted to carry a sickle bar in the usual manner. Trough 9 is provided with a generally vertically arranged extension plate 12. End closures 13 and 13' are secured to the ends of the trough and extension plate 12.

I provide an outlet 14 in the bottom of member 12 preferably midway its ends. This outlet extends upwardly from the rear edge of trough 9 terminating preferably as at B (see Figure 5). Trough outlet 14 has a suitable length for the free reception of the operating parts of an undershot type elevator which is designated in its entirety by reference character C. The operating parts of this elevator protrude forward through outlet 14 about as illustrated in Figures 5 and 14. Outlet 14 is extended vertically far enough so the elevator may float over varying sized streams of grain as will hereinafter appear.

My complete auger conveyor tube is designated in its entirety by reference character A comprising preferably a relatively large single piece tube 15 (see Figure 1). I provide a number of access openings 16—16 having detachable lids 17 used for assembling, oiling and inspecting purposes.

Tube 15 has secured thereto auger flights 18 and 19 which extend from the ends of the tube preferably slightly past the adjacent ends of outlet 14. Auger flights 18 and 19 turn in opposite directions as indicated so as to move the cut grain toward the center of the trough or in front of outlet 14, the tube turning in the direction indicated by curvilinear arrows in Figures 3 and 5.

I provide as special equipment one or more sweeper blades 20 made from rubber or the like and secure them longitudinally to tube 15 preferably midway the ends of the tube (see Figures 12 and 13) by means of brackets 21—21. When more than one sweeper blade is used, they are circumferentially spaced and if desired staggered circumferentially.

Tube 15 (see Figure 1) is rigidly secured to a shaft 24, this shaft being mounted on the right hand end closure 13 of the trough by means of a bearing 25, the bearing being secured to a plate 26 which is vertically adjustably secured to closure 13 as will hereinafter appear. Shaft 24 preferably carries a sprocket 27 on its outer end so member A may be chain driven. The other end of tube 15 is rotatably mounted on a shaft 28 in bearings 29—29. The outer end of shaft 28 is turnably mounted in end closure plate 26' by means of the hub of an arm 31 (see Figures 1 and 5).

The hub of arm 31 is rigidly secured to shaft 28 with the free end of the arm adjustably secured to closure member 26' (see Figure 5) in any suitable manner preferably by means of a bolt 32 and a slot 33 in the end closure 26' for a purpose which will hereinafter appear. Bearing 25 and the hub of arm 31 are mounted on end closures 13 and 13' which are in turn vertically adjustably secured to these members as follows:

Members 13 and 13' have enlarged openings 34 and 34' through which shafts 24 and 28 extend and these plates (see Figures 3 and 5) are secured to members 13 and 13' by means of a number of bolts 35, the bolts extending through vertically arranged slots preferably in members 13 and 13' whereby the plates may be secured in vertically adjusted positions as follows:

A bracket 40 is secured to the outside of member 13 preferably by means of a stiffening bar 41. Another bracket 39 is secured to member 13'. Eye bolts 42—42 are secured to plates 26 and 26' which extend through brackets 39 and 40 having holding nuts 42'. Thus clearly by loosening the nuts on bolts 35, eye bolts 42 may be adjusted for raising or lowering plates 26 and 26' after which bolts 35 may be made taut so shafts 24 and 28 are rigidly, rotatably supported on the end closures 13 and 13' of the auger table.

After plates 26 and 26' have been adjusted, they may be made taut if desired, or bolts 35 may be adjusted loose enough so plates 26 and 26' are free to raise, permitting tube A to float over varying quantities of grain, nuts 42' acting to determine the lowest position of the tube.

I provide partitions 52 as shown in Figure 1 to which bearings 29 are secured. Shafts 28 and 53 protrude inwardly through bearings 29. The inner ends of these shafts are secured to crank brackets 54—54 and the outer ends of these crank brackets are secured to a crank shaft 55. Shafts 28 and 53 are in axial alignment with tube 15, and shaft 55 is parallel to shafts 28 and 53.

I will now describe the purpose of crank shaft 55 and its operating parts. A suitable number of fingers 60 are secured to bearings 61. Fingers 60 are preferably made from rectangular bars and their bearings are closely spaced as indicated (see Figures 1 and 2). In order to supply lubrication to these bearings, a grease gun fitting 62 is screw threaded into opening 62' which extends through the major length of crank shaft 55 and an outlet opening 63 is provided for each bearing 61; thus all of the bearings can be lubricated from one fitting.

Fingers 60 have a length, whereby when the crank shaft 55 is in any operating position the ends of the fingers can not move inwardly far enough to be disengaged from their guide bearings which in their entireties are designated by reference character D. Members D are mounted in openings 64 in tube 15 (see Figure 10). These bearings comprise straps 65 and 66 which are removably secured to member 15 on opposite sides of openings 64 in any suitable manner (see Figure 10). Bearing members 64' are preferably made from a synthetic compound so they will act noiselessly and can be readily replaced if worn out. It will be seen that bearings 64' present large wearing surfaces and that they are free to rotate between members 65 and 66 and that the fingers are slidably mounted in these bearings. Members 65 and 66 each have slots 65' through which fingers 60 extend without contact therewith.

I provide preferably four rows of circumferentially spaced finger assemblies and two or three fingers in each row. In the design shown there is a total of preferably ten fingers (see Figure 1). Therefore there will be two fingers longitudinally spaced in the position shown in Figure 7, three fingers in the position shown in Figure 8, three fingers in the position shown in Figure 9 and two fingers in the position shown in Figure 10, so that at each quarter turn of tube 15, a number of longitudinally spaced fingers will be in the best position to engage the grain after it has been cut by the cutter bar and the fingers will be retracted early enough to disengage the grain before they pass outlet 14.

Figure 7:
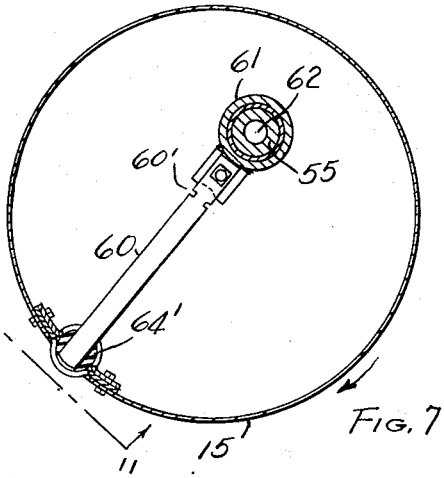
Figs. 7, 8, 9 and 10 illustrate the different positions assumed by the fingers with the tube in its lowest position and the finger crank in its highest position.
Figure 9:
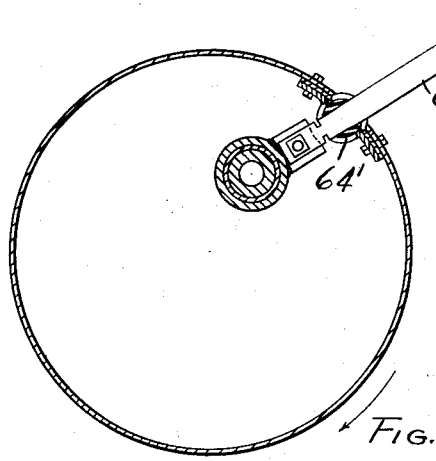

The fingers protrude farthest when shaft 55 is in the position shown in Figure 9, and the fingers are in their innermost position as shown in Figure 7 when shaft 55 is in the position shown in this figure. In these positions plates 26 and 26' are in their lowest position relative to trough 10, the position of shaft 55 being such as will cause the fingers to be retracted as they pass upwardly past outlet 14. Thus as illustrated in Figure 7, the rear fingers will be fully retracted so as not to carry the grain upward past the platform outlet.

Figure 8:
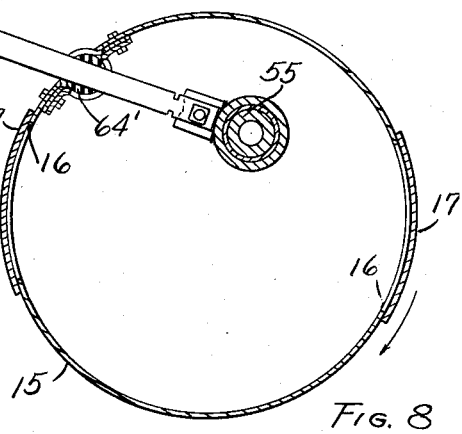
Figure 10:
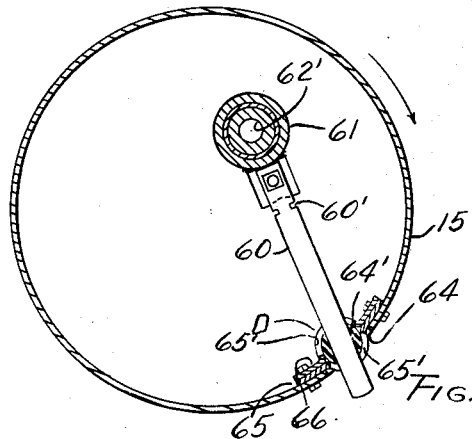
Figure 11:
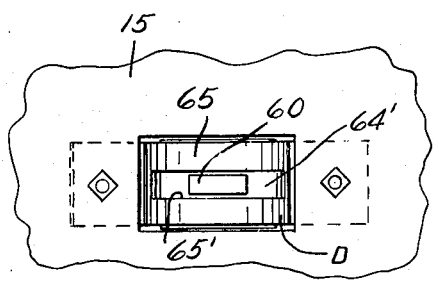
Fig. 11 is a front view of a fraction of the auger tube looking into the protruding end of a finger.
Figure 15:
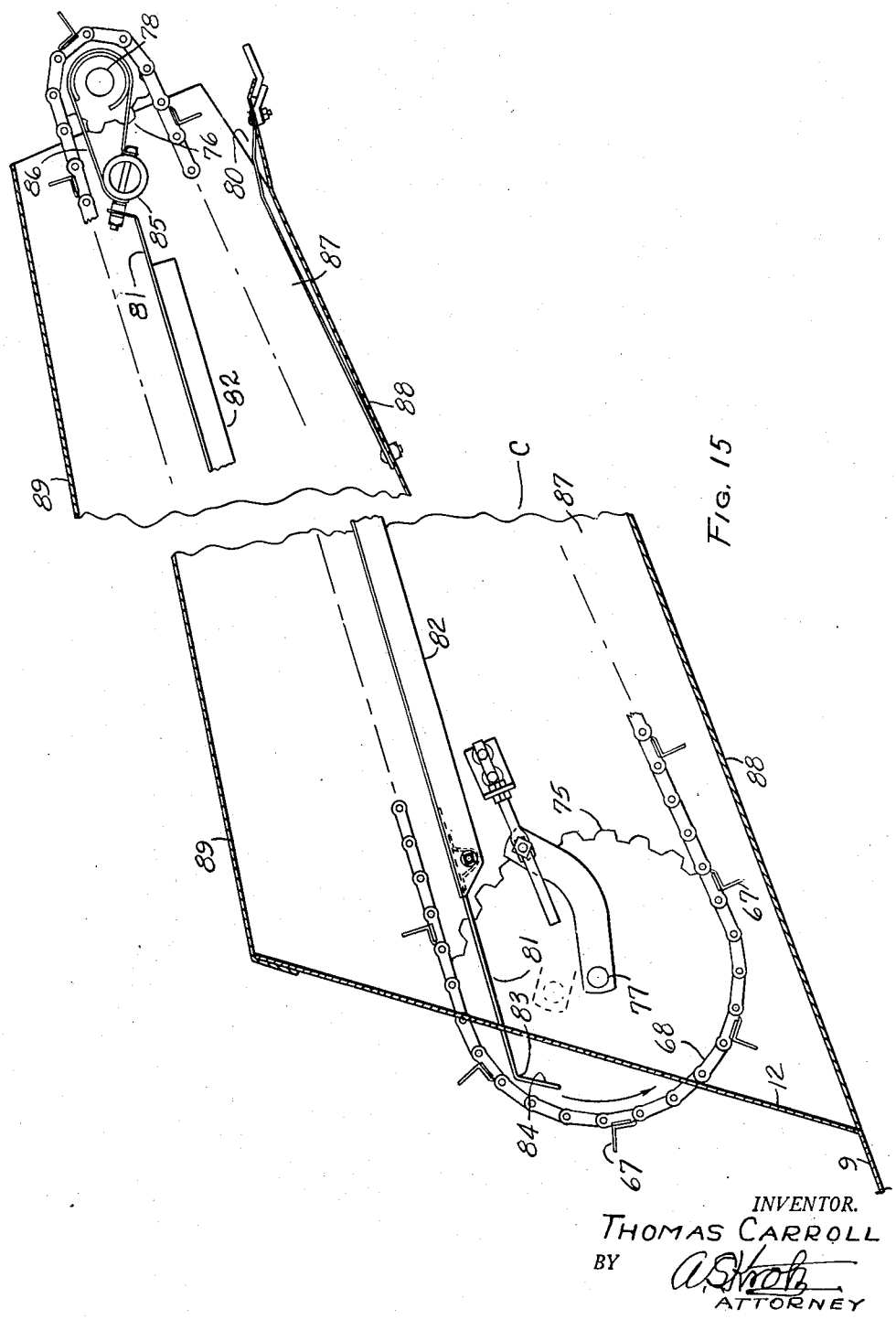
Fig. 15 is an enlarged view of the undershot elevator with the near side plate removed illustrating the means provided for gathering any grain that may fall between the upper flights and causing it to be discharged forwardly from between the flights so it can fall in front of the elevator and join the grain passing under the elevator.

The positions of the other fingers are substantially as shown in Figures 8, 9 and 10. Clearly as shaft 55 is moved around shafts 28 and 53 as axes, the relative position of the fingers will be changed from the positions shown, whereby they revolve around shaft 55 as an axis and engage the grain in a manner to most efficiently move the grain rearwardly toward the outlet in any vertical position of tube 15.

Assuming that member A is raised to its highest position for handling a heavy stand of grain then the free end of arm 31 is adjusted upwardly so as to turn shaft 28 anticlockwise and move shaft 55 downward. Thus it will be seen by scrutinizing Figures 7 through 10 that the ends of the fingers may continue to operate in substantially the same position relative to the bottom of the trough and irrespective of the position of member A so the fingers will operate sufficiently in any vertical position of member A.

It will be seen that the fingers move out and in through bearings D at every revolution of the auger shaft and at various angles.

It will be understood that a finger might be accidently bent and seriously injure the mechanism. I provide means to avoid this by preferably cutting slits 60' in opposite sides of the fingers and close to bearing 61, or otherwise weakening the finger near the housing. Thus if a finger meets a serious obstruction, instead of being bent, the finger will break at this point.

Referring now specifically to Figures 5 and 14, it will be noted that the front end of the operating part of the elevator protrudes a considerable distance through outlet 12. Thus the sides of the protruding part of the elevator would act to clog the grain adjacent member 12 as it moves toward the elevator. I provide semi-cone shaped members 69—69 which are secured to member 12 as shown, the inner ends of these cones being adjacent the protruding end of the elevator. Thus the inwardly moving grain will be diverted forward and in front of the protruding end of the elevator and prevented from clogging. In other words the grain can not hesitate in its passage to and under the elevator, as indicated by curvilinear arrows in Figure 5.

It will be seen that as the grain falls rearwardly toward tube 15 it will be engaged by the flights and conveyed toward the center of the trough where it will be urged rearwardly toward the trough outlet.

I will now further describe certain important details of my undershot elevator. Chains 68—68 are carried by sprockets 75—75 and 76—76. Sprockets 75 are mounted on a front shaft 77 which is mounted in any suitable manner so it may raise and lower for varying volumes of grain. Sprockets 76 are mounted on driving shaft 78 which is in a fixed position and rotatably mounted on the rear end of side walls 87 of elevator C. The bottom chute of this elevator is designated by reference character 88 and the top or cover plate is designated by reference character 89. Outlet 14 is high enough to permit the forward end of the operating parts of elevator C to raise and lower as described. The forward end of the housing of this elevator C is secured to plate 12 in any suitable manner.

Means are provided whereby the platform may be raised and lowered on a radius with drive shaft 78 and near the outlet 80 of the elevator which is a short distance in front of the threshing cylinder. Conventional means are provided for guiding the grain released by the elevator under the thresher cylinder.

In elevators of the class some grain may be carried by the flights over the delivery end of the operating parts of the elevator. When this occurs, this grain will fall down between the flights and on top of the lower chain which carries it forward and winds it around sprocket 76 and shaft 78.

I provide means for gathering this grain and feeding it forward to a point where it will be discharged forwardly between the flights and then fall down and join the straw passing under the elevator. This means comprises a plate 81 having side flanges 82 which are secured to side walls 87, its forward end terminating as at 83 into a flange 84. Thus the grain falling on plate 81 will be discharged forwardly between flights 67. The rear end of plate 81 is preferably anchored to a tube 85 which is secured at its ends to side walls 87 and having a looped plate 86 which is fastened at opposite ends to tube 85 and extends around shaft 78 as illustrated, plate 86 having slots through which sprocket 76 extends so chain 68 is free to pass around this sprocket without contacting the plate. Thus it will be seen that grain carried over the top of sprocket 76 and shaft 78, will be caused to fall on plate 81 and move forward and be discharged between flights 67 and fall on the straw as it passes from the auger tube under the front end of the elevator, thus to prevent numerous delays caused by winding of the grain around the shafts and sprockets.

Clearly minor detail changes may be made in the design shown without departing from the spirit and scope of my invention as recited in the appended claims.

Having thus shown and described my invention, I claim:

1. In an undershot elevator for a harvester comprising, a front shaft, a pair of sprockets mounted on said front shaft, a rear drive shaft, a pair of smaller sprockets mounted on said rear drive shaft, an endless chain around each corresponding pair of large and small sprockets, said endless chains connected by transversely positioned spaced flights secured thereto; a gathering plate of substantially the same width as the elevator and positioned above said front and drive shafts comprising, a looped plate surrounding the drive shaft, a forward portion extending from said looped plate and terminating forward of said front shaft.

2. In an elevating mechanism of the undershot type for a harvester; a housing comprising, side walls, a cover plate, a bottom chute; an arm pivotally mounted at one end at the forward end of each side wall, a front shaft mounted on the other end of said arms, a pair of sprockets mounted on said front shaft, a rear drive shaft mounted adjacent the rear end of said sidewalls, a pair of smaller sprockets mounted on said drive shaft, an endless chain trained around each pair of corresponding large and small sprockets, a series of spaced transversely positioned flights connecting said chains; a gathering plate of substantially the same width as the elevator and positioned above said front and drive shafts and within said endless chains; said gathering plate comprising, a looped plate surrounding said drive shaft, a forward portion extending from said looped plate to a point forward of said front shaft.

References Cited in the file of this patent

UNITED STATES PATENTS

| Number | Name | Date |
|---|---|---|
| 1,338,514 | Majurus | Apr. 27, 1920 |
| 1,646,594 | Phelps et al. | Oct. 25, 1927 |
| 1,901,092 | Fisk | Mar. 14, 1933 |
| 1,917,134 | Levin | July 4, 1933 |
| 2,155,423 | Korsmo et al. | Apr. 25, 1939 |
| 2,369,745 | Millard et al. | Feb. 20, 1945 |
| 2,390,680 | Ausherman | Dec. 11, 1945 |
| 2,427,876 | Pool et al. | Sept. 23, 1947 |
| 2,469,580 | Scranton | May 10, 1949 |
| 2,478,009 | Pool | Aug. 2, 1949 |
| 2,529,180 | Oehler | Nov. 7, 1950 |